(12) United States Patent
Huynh et al.

(10) Patent No.: US 9,619,628 B2
(45) Date of Patent: Apr. 11, 2017

(54) SECURE SYSTEM FLASH SHARING

(71) Applicant: Intel Corporation, Santa Clara, CA (US)

(72) Inventors: Hung Huynh, Sacramento, CA (US); Nitin Sarangdhar, Portland, OR (US); Mikal Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 13/629,901

(22) Filed: Sep. 28, 2012

(65) Prior Publication Data

US 2014/0095855 A1 Apr. 3, 2014

(51) Int. Cl.
| | |
|---|---|
| *G06F 21/00* | (2013.01) |
| *G06F 12/00* | (2006.01) |
| *G06F 12/10* | (2016.01) |
| *G06F 9/00* | (2006.01) |
| *G06F 9/445* | (2006.01) |

(52) U.S. Cl.
CPC ............ *G06F 21/00* (2013.01); *G06F 9/00* (2013.01); *G06F 8/665* (2013.01); *G06F 12/00* (2013.01); *G06F 12/10* (2013.01); *G06F 2221/2129* (2013.01)

(58) Field of Classification Search
CPC .......... G06F 21/00; G06F 12/00; G06F 12/10; G06F 2221/2129; G06F 9/00; G06F 8/665
USPC ...................................... 713/2, 185
See application file for complete search history.

(56) References Cited

U.S. PATENT DOCUMENTS

| | | | | |
|---|---|---|---|---|
| 2002/0080974 | A1* | 6/2002 | Grawrock | 380/282 |
| 2002/0166061 | A1* | 11/2002 | Falik | G06F 8/665 726/34 |
| 2005/0210266 | A1* | 9/2005 | Cottrell et al. | 713/185 |
| 2008/0313471 | A1* | 12/2008 | Huang | G06F 21/10 713/185 |
| 2009/0006834 | A1* | 1/2009 | Rothman et al. | 713/2 |
| 2011/0066837 | A1* | 3/2011 | Lee | G06F 9/4401 713/2 |
| 2011/0093689 | A1* | 4/2011 | Pant et al. | 713/2 |
| 2011/0264833 | A1* | 10/2011 | Zhang et al. | 710/74 |
| 2014/0047229 | A1* | 2/2014 | Wiseman | G06F 13/14 713/2 |

* cited by examiner

*Primary Examiner* — Jaweed A Abbaszadeh
*Assistant Examiner* — Terrell Johnson
(74) *Attorney, Agent, or Firm* — Jordan IP Law, LLC

(57) ABSTRACT

Systems and methods may provide for securely transferring data from a flash component. In one example, the method may include receiving a download request from an embedded controller chip, obtaining information from the flash component in response to the download request, and transferring the information to the embedded controller chip.

28 Claims, 5 Drawing Sheets

SECURE SYSTEM FLASH SHARING

BACKGROUND

Technical Field

Embodiments generally relate to data transfer. More particularly, embodiments relate to securely transferring data from a flash component.

Discussion

In some instances, a computer component may need to retrieve data from a memory device prior to operation. For example, some embedded controller (EC) manufacturers may store EC operating instructions on a separate flash component, wherein the EC may "pull" the operating instructions from the flash component by assuming the role of "master" (with full read/write access). FIG. 1 is an illustration of an example an EC chip in the prior art that may pull information from a flash component.

Allowing an EC direct access to a flash component, however, may lead to security risks. For example, these risks may include the execution of malware or spyware masquerading as a bona fide EC, data replacement and/or tampering, and privacy breaches. In addition, in certain cases, the EC may be a customizable component including on-chip firmware. In these cases, costs of doing a thorough security analysis with regard to each unique EC configuration may be quite high.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
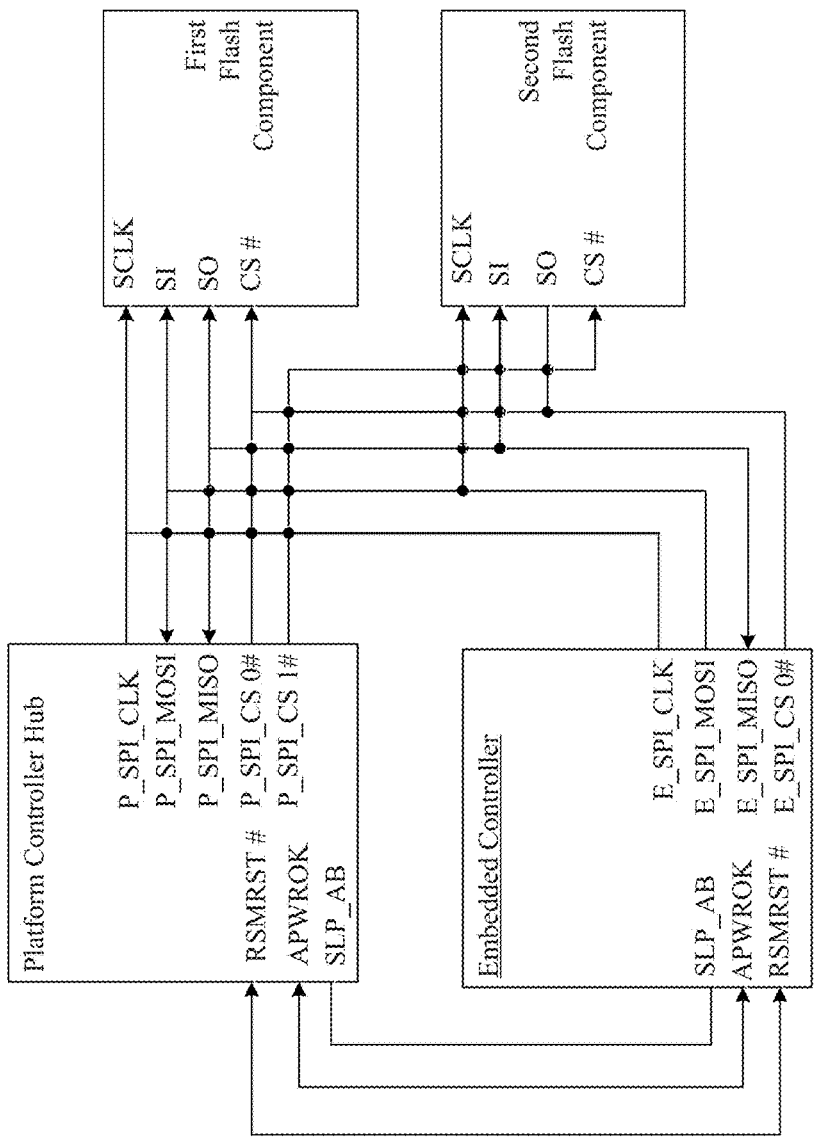
FIG. 1 is an illustration of an example of a conventional system.
Figure 2:
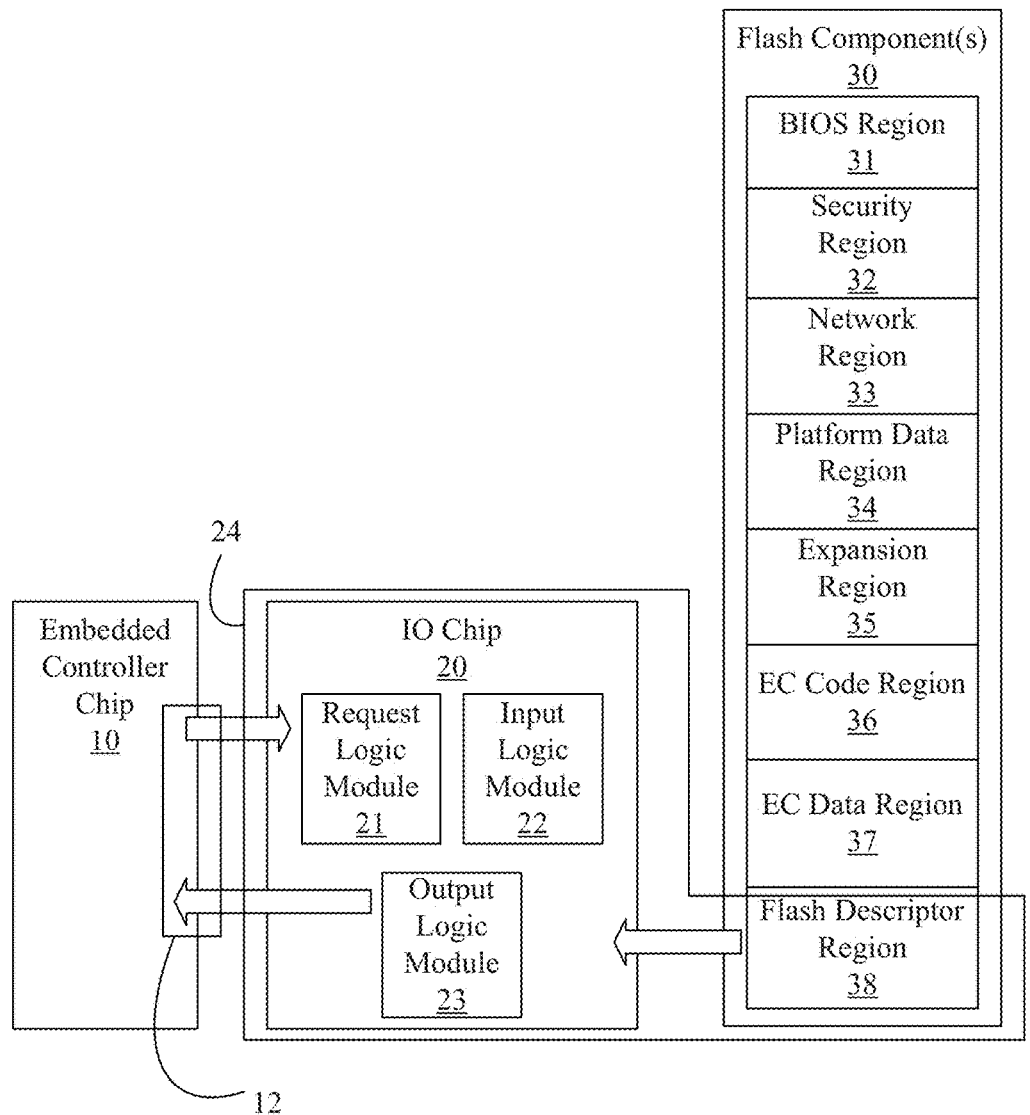
FIG. 2 is an illustration of an example of an interaction between a component and a flash component according to an embodiment.

Embodiments generally relate to securely transferring data from a flash component. In particular, as will be discussed in greater detail, embodiments may be configured to receive a request from a requesting entity for information located on a flash component, utilize a secure entity to obtain the requested information from the flash component, and utilize the secure entity to transfer the requested information to the requesting entity. FIG. 2 is an illustration of an example of data and/or code transfer between an EC chip 10 and one or more flash components 30 via an input output (IO) chip 20.

The EC chip 10 may be a controller configured to allow a first device to interface with a second device. In this example, the EC chip 10 may originate a request for data and/or code located on the flash component 30 (i.e., the requesting entity).

The flash component 30 may be any non-volatile memory component that may be electronically erased and reprogrammed. For example, the flash component 30 may include a BIOS (Basic Input Output System) region 31, a security region 32, a network region 33, a platform data region 34, an expansion region 35, an EC code region 36, an EC data region 37, and a flash descriptor region 38. Thus, in this example, the EC 10 may issue a read request for information located in the EC code region 36 or a write request to the EC data region 37. However, in this example, the EC may not issue a request for any other region outside of the EC code region 36 and the EC data region 37.

The IO chip 20 may be a secure entity configured to, among other things, facilitate communication (e.g., download request transfers) between the flash component 30 and any other coupled device. The IO chip may be included, for example (but not limited to), inside a platform controller hub (PCH) or a system on a chip (SOC). The IO chip 20 may include a request logic module 21, an input logic module 22, and an output logic module 23. In this example, the request module 21 may be configured to receive a download request from the EC chip 10. The input logic module 22 may process this request, and retrieve the requested information from the flash component 30. The output logic module 23 may transmit the requested information to the EC chip 10.

The IO chip 20 may retain a non-transferrable role of "master" with regard to accessing the flash component 30, wherein the use of the IO chip 20 as secure arbiter of requests to the flash component 30 may reduce security risks. Accordingly, a first trust boundary 12 may be established that does not include the EC chip 10 in its entirety. In addition, a second trust boundary 24 may be established that includes the IO chip 20 and the flash descriptor region 38. So, in this example, by preventing direct ownership of the flash component 30 by the EC chip 10, the risk of information replacement or tampering, execution of malware or spyware, and privacy breaches may be minimized.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment described above, the requesting entity may be an EC. However, this need not necessarily be the case. In another exemplary embodiment, the requesting entity may be another component requiring information from a flash component, such as, for example, a network controller.

Figure 3:
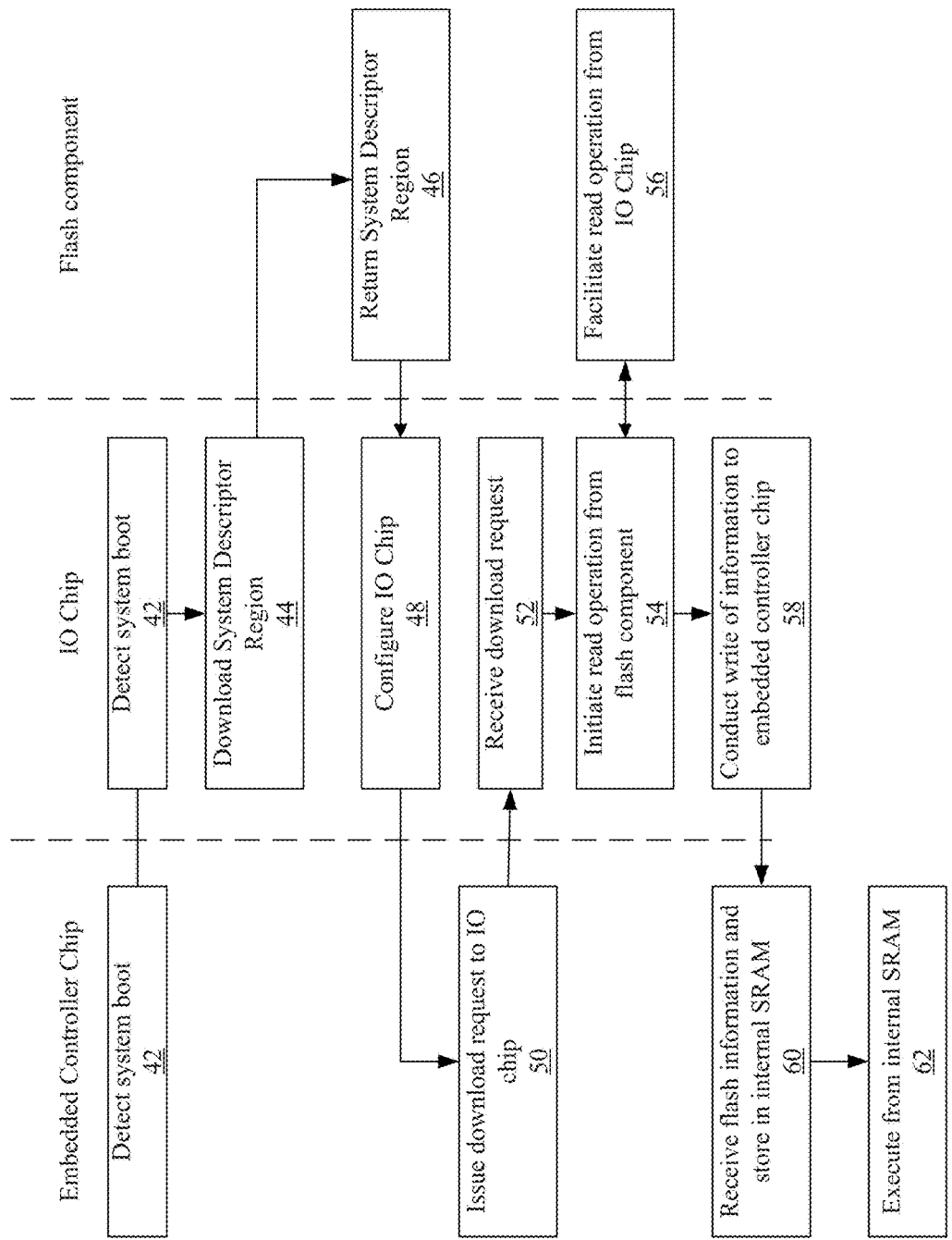
FIG. 3 is a flowchart of an example of a method of securely transferring data from a flash component according to an embodiment.

FIG. 3 is a flowchart of an example of a method of securely transferring information from a flash component to an EC chip via an IO chip according to an embodiment. In this example, an IO chip may operate both as a secure, intermediary arbiter of requests to the flash component, and as "master" as pertaining to access to the flash component.

The method might be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as the "C" programming language or similar programming languages.

At processing block 42, the EC chip and the IO chip may detect a system boot for a system. Upon system boot detection, at processing block 44, the IO chip may issue a request to download system descriptor region information. So, in this example, the IO chip may acquire system descriptor region information by reading a flash descriptor region of the flash component, such as the flash descriptor region 38 (FIG. 2). The flash descriptor region may include an address map of the flash device, and may denote which entity (i.e., a master) is allowed to read and write to a region of the flash component. For example, the flash descriptor region may indicate that an EC code region, such as the EC code region 36 (FIG. 2), may be a read only region to which the EC may issue a read operation. Also, it may indicate that the EC may issue a read/write operation to an EC data region, such as the EC data region 37 (FIG. 2). In this example, going forward, the IO chip may remain responsible for access control to different flash regions. At processing block 46, the flash component may return the system descriptor region information to the IO chip. At processing block 48, the IO chip may configure itself using the returned system descriptor information.

At processing block 50, the EC chip may issue a download request to an IO chip. In this example, the EC chip may be requesting the EC chip's operating instructions from a flash component coupled to the IO chip. The download request may include a particular location and download data size on the flash component where the operating instructions are located.

At processing block 52, the IO chip may receive the EC's request. Upon receiving the request, the IO chip may verify that the particular location on the flash component is accessible by the EC (e.g., the EC code region 36 (FIG. 2)). At processing block 54, upon verification, the IO chip may conduct a read operation to obtain the operating instructions from the flash component. At processing block 56, the flash component may facilitate the read operation from the IO chip.

At processing block 58, the IO chip may conduct a write operation to provide the operating instructions to the EC chip. So, instead of the EC itself "pulling" the operating instructions, the IO chip may verify the download request from the EC chip, retrieve the operating instructions, and "push" the operating instructions to the EC chip in order to minimize security risks.

At processing block 60, the EC chip may receive the operating instructions from the flash component, wherein the EC chip may verify the operating instructions for integrity, and store the operating instructions in an internal memory of the EC chip (e.g., an SRAM component). At processing block 62, the EC chip may access the operating instructions from the internal memory of the EC chip during execution. Upon initiating execution, the EC chip may withdraw its request to the IO for the operating instructions.

The sequence and numbering of blocks depicted in FIG. 3 is not intended to imply an order of operations to the exclusion of other possibilities. Those of skill in the art will appreciate that the foregoing systems and methods are susceptible of various modifications, variations, and alterations.

For example, in the embodiment described above, the EC chip may withdraw its request for operating instructions from the flash component after initiating execution (i.e., processing block 62). However, this need not necessarily be the case. In another example, the EC chip may withdraw its request after the write operation is completed (i.e., processing block 58).

Also, for example, in the example described above, the EC may issue a read request. However, this need not necessarily be the case. Alternatively, the EC chip may issue a write request to an IO chip. For example, the EC chip may request that data be written permanently to the flash device. The IO chip may receive the EC's request, and may verify that a particular location on the flash component is write accessible by the EC, such as the EC data region 37 (FIG. 2). Upon verification, the chip may conduct the write operation to the flash component.

Figure 4:
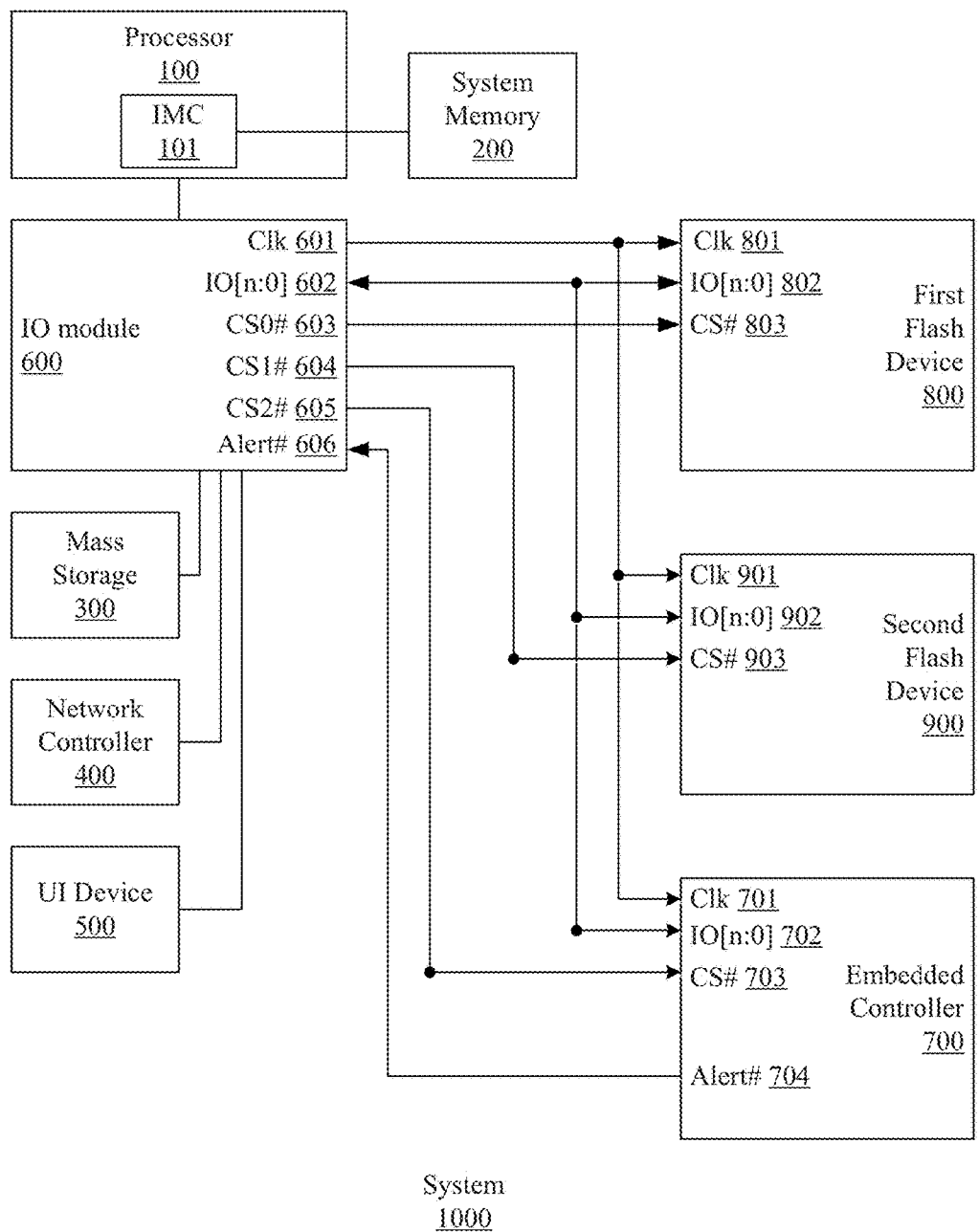
FIG. 4 is a block diagram of an example of a system configured to securely transfer data from a flash component according to an embodiment.

FIG. 4 is a block diagram of an example of a system 1000 configured to securely transfer information from a flash component according to an embodiment. The system 1000 may include a processing component 100, a system memory 200, a mass storage 300, a network controller 400, and a user interface (UI) device 500. In addition, the system 1000 may include an IO module 600, an EC 700, a first flash component 800, and a second flash component 900.

The processing component 100 may include at least one computer processor that may be utilized to execute computer-readable executable instructions. In one example, the processing component 100 includes an integrated memory controller (IMC) 101 to facilitate communication with the system memory 20. Additionally, the processing component 100 and the IO module 600 could be incorporated in to the same package/chip.

The system memory 200 and the mass storage 300 may be any component or device capable of storing information. In this example, the system memory 200 may be configured to store, among other things, information relating to the operation of the system 1000. As already noted, the processing component 100 may communicate with the system memory 200 via the IMC 101. The mass storage 300 may be used to store, for example, personal information of a user. The network controller 400 may be configured to couple the system 1000 to another computer network, and the UI device 500 may facilitate interaction between a user and the system 1000.

The IO module 600 may be used to facilitate input and output requests for the system 1000. In this example, an IO chip may operate as both a secure, intermediary arbiter of requests to the flash component, and as "master" as pertaining to access to the flash component. The IO module may include a clock signal interface 601, an IO signal interface 602, a first chip select signal interface 603, a second chip select signal interface 604, a third chip select signal interface 605, and an alert signal interface 606.

The IO module 600 may utilize the clock signal interface 601 to maintain synchronicity with the other components of the system 1000. In the illustrated example, the EC 700 may assert an alert signal 704 to the alert signal interface 606 to request information located on either the first flash component 800 or the second flash device 900.

After receiving a request from the EC 700, the IO module 600 may utilize the IO signal interface 605 to determine what the EC 700 is requesting. The first chip select signal interface 603 may be used to notify the first flash component 800 that it is to communicate with the IO module 600 and the second chip select signal 604 may be used to notify the second flash component 900 that it is to communicate with the IO module 600. For example, upon receiving a download request from the EC 700 for information located on the first flash component 800, the IO module 600 may assert a chip select signal via the first chip select signal interface 603 and initiate a read operation from the first flash component 800. Similarly, the IO module 600 may utilize the second chip select signal interface 604 to initiate a read operation from the second flash component 900.

In addition, the IO module 600 may utilize the IO signal interface 602 to retrieve information from and transmit information to another component. For example, upon determining that the EC 700 has made a valid request to read information from the first flash component 800, the IO module 600 may utilize the IO signal interface 602 to retrieve the requested information from the first flash component 800, and to transmit the requested information to the EC 700. In various examples, the IO signal interface 602 may include a single communication lane, double communication lanes, or quadruple (quad) communication lanes.

The IO module 600 may utilize the third chip select signal interface 605 to notify the EC 700 that it is to communicate with the IO module 600. For example, upon detecting the presence of the EC 700, the IO module 600 may assert a chip select signal via the third chip select signal interface 605 and then obtain configuration information (e.g., maximum payload, read-request size, maximum frequency, etc.) from the EC 700 via the IO signal interface 602. Upon verifying the configuration information of the EC 700, the IO module 600 may further assert a chip select signal via the third chip select signal interface 605 and then set particular configurations (e.g., an operating frequency) on the EC 700 via the IO signal interface 602. In addition, upon receiving a download request from the EC 700, the IO module 600 may also assert a chip select signal via the third chip select signal interface 605 to select the EC 700 for transfer of the flash information to the EC 700.

In this example, the IO module 600 may utilize only one of the three chip select interfaces at a time to receive data from a source, and to transmit the data to a destination. Also, in this example, the IO module 600 may temporarily store the data locally on IO module 600.

Optionally, IO module 600 may also utilize the third chip select signal interface 605 and the first chip select signal interface 603 concurrently to communicate data directly between the first flash component 800 and the EC 700. In this case, data communication may occurs on an IO signal interface 802 and an IO signal interface 702 respectively (discussed in greater detail below). In this example, the IO module 600 may optionally not store the data locally.

Similarly, the IO module 600 may utilize the third chip select signal interface 605 and the second chip select signal interface 604 concurrently to communicate data directly between the second flash component 900 and the EC 700. The data communication may occur on an IO signal interface 902 and an IO signal interface 702 respectively (discussed in greater detail below). In this example, the IO module 600 may optionally not store the data locally.

In embodiments of the present invention, the IO module 600 may be at least one of a hardware component such as a circuit element (e.g., including transistors, resistors, capacitors, inductors, and so forth), an integrated circuit, application specific integrated circuit (ASIC), programmable logic device (PLD), digital signal processors (DSP), field programmable gate array (FPGA), logic gates, a firmware component, a register, semiconductor device, chips, microchips, chip sets, and so forth.

The EC 700 may be a controller configured to interface with a coupled device. The EC 700 may include a clock signal interface 701, the IO signal interface 702, a chip select signal interface 703, and an alert signal interface 704.

The EC 700 may utilize the clock signal interface 701 to maintain synchronicity with the other components of the system 1000. The EC 700 may utilize the IO signal interface 702 to communicate with other components of system 1000. In this example, the EC 700 may not directly communicate with any other module in system 1000 unless the third chip select signal interface 605 may be asserted.

In embodiments of the present invention, the EC 700 may be at least one of a hardware component such as a circuit element (e.g., including transistors, resistors, capacitors, inductors, and so forth), an integrated circuit, ASIC, PLD, DSP, FPGA, logic gates, a firmware component, a register, semiconductor device, chips, microchips, chip sets, and so forth.

The first flash component 800 may be a non-volatile memory component that may be electronically erased and reprogrammed. The first flash component 800 may include a clock signal interface 801, the IO signal interface 802, and a chip select signal interface 803.

The first flash component 800 may utilize the clock signal interface 801 to maintain synchronicity with the other components of the system 1000. The first flash component 800 may also utilize the IO signal interface 802 to communicate with other components of system 1000. In various examples, the IO signal interface 802 may include a single communication lane, double communication lanes, or a quadruple (quad) communication lane. The first flash component 800 may utilize the chip select signal interface 803 to determine when to receive commands from the IO module 600. In this example, the first flash component 800 may not with any other component of the system 1000 unless the first chip select signal interface 603 may be asserted.

Similar to the first flash component 800, the second flash component 900 may be a non-volatile memory component that may be electronically erased and reprogrammed. The second flash component 900 may include a clock signal interface 901, the IO signal interface 902, and a chip select signal interface 903.

The second flash component 900 may utilize the clock signal interface 901 to maintain synchronicity with the other components of the system 1000. The second flash component 900 may utilize the IO signal interface 902 to communicate with other components of system 1000. The second flash component 900 may utilize the chip select signal interface 903 to determine when to receive commands from the IO module 600. In this example, the second flash component may not directly communicate with any other component in system 1000 unless the second chip select signal interface 604 may be asserted.

The sequence and numbering of blocks depicted in FIG. 4 is not intended to imply an order of operations to the exclusion of other possibilities. Those of skill in the art will appreciate that the foregoing systems and methods are susceptible of various modifications, variations, and alterations.

Figure 5:
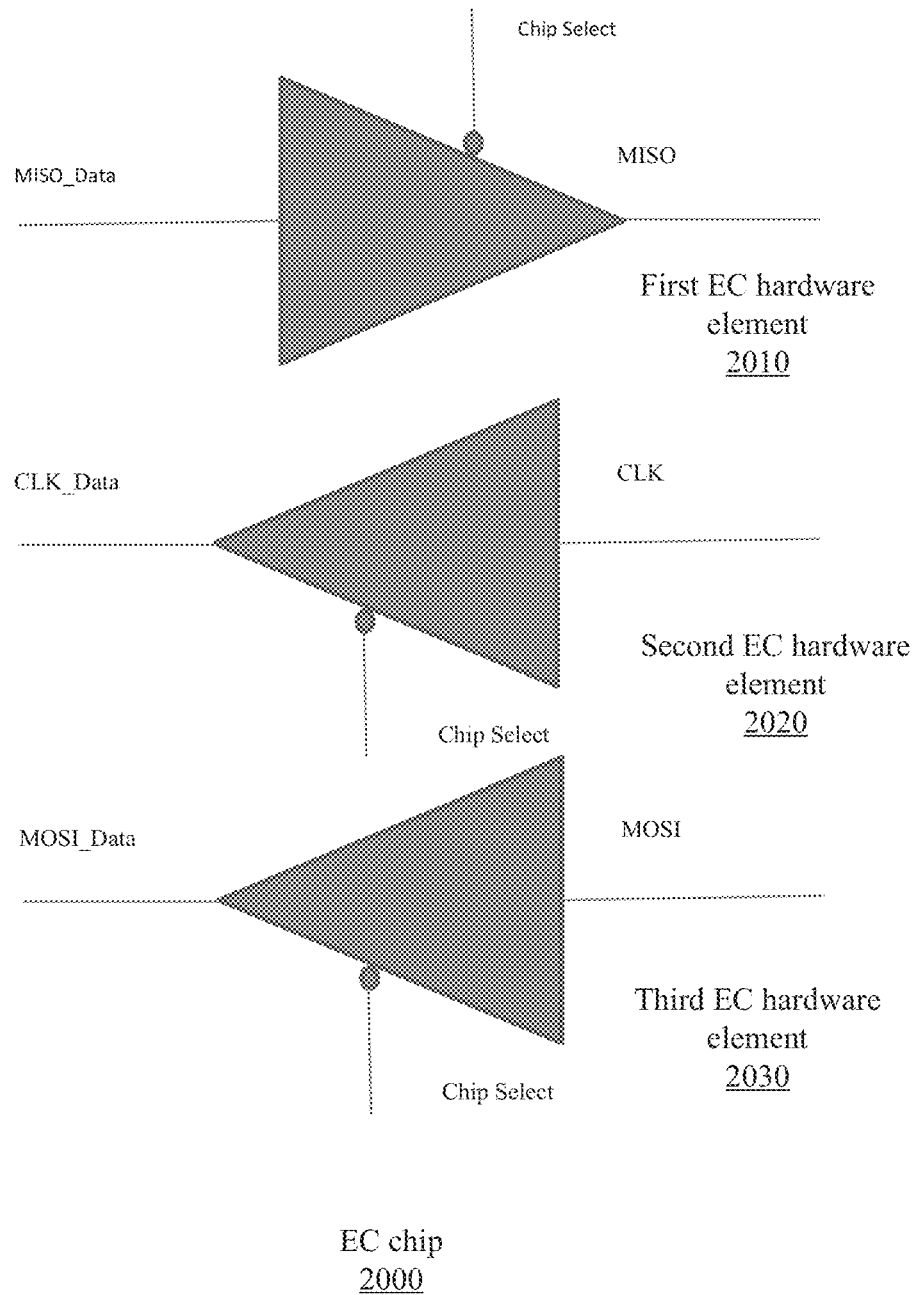
FIG. 5 is a block diagram of an example of an EC chip according to an embodiment.

FIG. 5 is a block diagram of an example of a portion of an EC chip according to an embodiment. In this example, the portion of the EC chip 2000 may be part of a trust boundary, similar to the first trust boundary 12 (FIG. 2), that is utilized to facilitate a method of securely transferring data from a flash component as described herein. In this example, the EC chip 2000 may include a first EC hardware element 2010 having a master in slave out (MISO) line, a second EC hardware element 2020 having a clock (CLK) line, and a third hardware element 2030 having a master out slave in (MOSI) line. In this example, the EC chip 2000 may only drive MISO output, or receive CLK or MOSI input if a chip select signal may be asserted.

The sequence and numbering of blocks depicted in FIG. 5 is not intended to imply an order of operations to the exclusion of other possibilities. Those of skill in the art will appreciate that the foregoing systems and methods are susceptible of various modifications, variations, and alterations.

Embodiments may therefore provide for a method of operating an IO chip comprising receiving a download request from an embedded controller chip and asserting a first chip select signal to a flash component in response to the download request. The method may also include conducting a read of information from the flash component while the first chip select signal is asserted, wherein the IO chip functions as a master during the read of the information from the flash component, asserting a second chip select signal to the embedded controller chip, conducting a write of the information to the embedded controller chip while the second chip select signal is asserted, wherein the IO chip functions as a master during the write of the information to the embedded controller chip.

In one example, the download request is associated with a system boot.

In another example, the information includes one or more security parameters.

In still another example, the information includes basic input output system (BIOS) information.

Embodiments may also provide a system comprising a flash component containing information, an embedded controller chip to issue a download request, and an IO chip coupled to the flash component and the embedded controller chip. The IO chip may include a request logic module to receive the download request from the embedded controller chip, an input logic module to obtain the information from the flash component in response to the download request, and an output logic module to transfer the information to the embedded controller chip.

In one example, the input logic module is to assert a chip select signal to the flash component and conduct a read of the information from the flash component while the chip select signal is asserted.

In another example, the input logic module is to function as a master during the read of the information from the flash component.

In still another example, the output logic module is to assert a chip select signal to the embedded controller chip and conduct a write of the information to the embedded controller chip while the chip select signal is asserted.

In another example, the output logic module is to function as a master during the write of the information to the embedded controller chip.

In yet another example, the download request is to be associated with a system boot.

In one example, the information includes one or more security parameters.

In still another example, the information is to include basic input output system (BIOS) information.

Another embodiment may provide an IO chip comprising a request logic module to receive a download request from an embedded controller chip, an input logic module to obtain information from a flash component in response to the download request, and an output logic module to transfer the information to the embedded controller chip.

In one example, the input logic module is to assert a chip select signal to the flash component and conduct a read of the information from the flash component while the chip select signal is asserted.

In another example, the input logic module is to function as a master during the read of the information from the flash component.

In one example, the output logic module is to assert a chip select signal to the embedded controller chip and conduct a write of the information to the embedded controller chip while the chip select signal is asserted.

In still another example, the output logic module is to function as a master during the write of the information to the embedded controller chip.

In one example, the download request is to be associated with a system boot.

In another example, the information is to include one or more security parameters.

In yet another example, the information is to include basic input output system (BIOS) information.

Still another embodiment may provide for a computer readable storage medium comprising a set of instructions which, if executed by an IO chip, cause the IO chip to receive a download request from an embedded controller chip, obtain information from a flash component in response to the download request, and transfer the information to the embedded controller chip.

In one example, the instructions, if executed, cause the IO chip to assert a chip select signal to the flash component and conduct a read of the information from the flash component while the chip select signal is asserted.

In another example, the instructions, if executed, cause the IO chip to function as a master during the read of the information from the flash component.

In still another example, the instructions, if executed, cause the IO chip to assert a chip select signal to the embedded controller chip and conduct a write of the information to the embedded controller chip while the chip select signal is asserted.

In one example, the instructions, if executed, cause the IO chip to function as a master during the write of the information to the embedded controller chip.

In still another example, the download request is to be associated with a system boot.

In one example, the information is to include one or more security parameters.

In another example, the information is to include BIOS information.

Techniques described herein may therefore provide a secure way for embedded controllers of a computing platform to receive information (e.g., code and data) from flash memory (e.g., system Serial Peripheral Interconnect/SPI flash) without allowing the embedded controllers become part of the platform trusted computing base. Rather, the embedded controllers may be treated as slave devices that are required to accept their code and data as part of power up programming, wherein the platform may function before the embedded controllers have access to regular firmware. Thus, cost savings associated with offloading the storage of embedded controller code and data to shared flash can be achieved without posing security and privacy risks to the platform.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method of operating an input output (IO) chip comprising:
 receiving a download request from an embedded controller chip, wherein the receiving is performed by an IO chip coupled to the embedded controller chip, the IO chip to isolate the embedded controller chip with respect to a flash component during one or more operations involving a flash component by verifying the download request from the embedded controller chip to prevent access to the flash component by the embedded controller chip and to prevent control of the flash component by the embedded controller chip;

asserting a first chip select signal to the flash component in response to the download request;

conducting a direct read of information from the flash component by the IO chip while the first chip select signal is asserted, wherein the IO chip functions as a master during the read of the information from the flash component, and wherein the IO chip is directly coupled to the flash component;

asserting a second chip select signal to the embedded controller chip; and conducting a write of the information to the embedded controller chip while the second chip select signal is asserted, wherein the IO chip functions as a master during the write of the information to the embedded controller chip.

2. The method of claim 1, wherein the download request is associated with a system boot.

3. The method of claim 1, wherein the information includes one or more security parameters.

4. The method of claim 1, wherein the information includes basic input output system (BIOS) information.

5. A system comprising:
a flash component containing information;
an embedded controller chip to issue a download request; and
an input output (IO) chip coupled to the embedded controller chip and to the flash component to isolate the embedded controller chip with respect to the flash component during one or more operations involving the flash component by verifying the download request from the embedded controller chip to prevent access to the flash component by the embedded controller chip and to prevent control of the flash component by the embedded controller chip, wherein the TO chip is to be directly coupled to the flash component, the TO chip including,
a request logic module to receive the download request from the embedded controller chip,
an input logic module to obtain the information directly from the flash component in response to the download request, and
an output logic module to transfer the information to the embedded controller chip.

6. The system of claim 5, wherein the input logic module is to assert a chip select signal to the flash component and conduct a read of the information from the flash component while the chip select signal is asserted.

7. The system of claim 6, wherein the input logic module is to function as a master during the read of the information from the flash component.

8. The system of claim 5, wherein the output logic module is to assert a chip select signal to the embedded controller chip and conduct a write of the information to the embedded controller chip while the chip select signal is asserted.

9. The system of claim 8, wherein the output logic module is to function as a master during the write of the information to the embedded controller chip.

10. The system of claim 5, wherein the download request is to be associated with a system boot.

11. The system of claim 5, wherein the information includes one or more security parameters.

12. The system of claim 5, wherein the information is to include basic input output system (BIOS) information.

13. An input output (IO) chip comprising:
a request logic module to receive a download request from an embedded controller chip;
an input logic module to obtain information directly from a flash component in response to the download request; and
an output logic module to transfer the information to the embedded controller chip, wherein the IO chip is to isolate the embedded controller chip with respect to the flash component during one or more operations involving the flash component by verifying the download request from the embedded controller chip to prevent access by the embedded controller chip to the flash component and to prevent control of the flash component by the embedded controller chip.

14. The IO chip of claim 13, wherein the input logic module is to assert a chip select signal to the flash component and conduct a read of the information from the flash component while the chip select signal is asserted.

15. The IO chip of claim 14, wherein the input logic module is to function as a master during the read of the information from the flash component.

16. The IO chip of claim 13, wherein the output logic module is to assert a chip select signal to the embedded controller chip and conduct a write of the information to the embedded controller chip while the chip select signal is asserted.

17. The IO chip of claim 16, wherein the output logic module is to function as a master during the write of the information to the embedded controller chip.

18. The IO chip of claim 13, wherein the download request is to be associated with a system boot.

19. The IO chip of claim 13, wherein the information is to include one or more security parameters.

20. The IO chip of claim 13, wherein the information is to include basic input output system (BIOS) information.

21. A non-transitory computer readable storage medium comprising a set of instructions which, if executed by an input output (IO) chip coupled to an embedded controller chip and to a flash component, cause the IO chip to:
receive a download request from the embedded controller chip;
obtain information directly from the flash component in response to the download request; and
transfer the information to the embedded controller chip, wherein the IO chip is to isolate the embedded controller chip with respect to the flash component during one or more operations involving the flash by verifying the download request from the embedded controller chip component to prevent access by the embedded controller chip to the flash component and to prevent control of the flash component by the embedded controller chip.

22. The medium of claim 21, wherein the instructions, if executed, cause the IO chip to:
assert a chip select signal to the flash component; and
conduct a read of the information from the flash component while the chip select signal is asserted.

23. The medium of claim 22, wherein the instructions, if executed, cause the IO chip to function as a master during the read of the information from the flash component.

24. The medium of claim 21, wherein the instructions, if executed, cause the IO chip to:

assert a chip select signal to the embedded controller chip; and conduct a write of the information to the embedded controller chip while the chip select signal is asserted.

25. The medium of claim 24, wherein the instructions, if executed, cause the IO chip to function as a master during the write of the information to the embedded controller chip.

26. The medium of claim 21, wherein the download request is to be associated with a system boot.

27. The medium of claim 21, wherein the information is to include one or more security parameters.

28. The medium of claim 21, wherein the information is to include basic input output system (BIOS) information.

* * * * *

UNITED STATES PATENT AND TRADEMARK OFFICE
CERTIFICATE OF CORRECTION

PATENT NO. : 9,619,628 B2  
APPLICATION NO. : 13/629901  
DATED : April 11, 2017  
INVENTOR(S) : Huynh et al.

Page 1 of 1

It is certified that error appears in the above-identified patent and that said Letters Patent is hereby corrected as shown below:

In the Claims

At Column 11, Claim number 5, Line number 42, delete "TO" and insert --IO--

At Column 11, Claim number 5, Line number 43, delete "TO" and insert --IO--

Signed and Sealed this  
Nineteenth Day of June, 2018

Andrei Iancu  
*Director of the United States Patent and Trademark Office*